United States Patent
Lin et al.

(10) Patent No.: US 9,279,956 B2
(45) Date of Patent: Mar. 8, 2016

(54) OPTICAL IMAGING LENS AND ELECTRONIC DEVICE COMPRISING THE SAME

(71) Applicants: Chia-Cheng Lin, Taichung (TW); Ta-Cheng Fan, Taichung (TW)

(72) Inventors: Chia-Cheng Lin, Taichung (TW); Ta-Cheng Fan, Taichung (TW)

(73) Assignee: Genius Electronic Optical Co., Ltd., Central Taiwan Science Park, Daya District, Taichung (TW)

( * ) Notice: Subject to any disclaimer, the term of this patent is extended or adjusted under 35 U.S.C. 154(b) by 0 days.

(21) Appl. No.: 14/093,533

(22) Filed: Dec. 2, 2013

(65) Prior Publication Data

US 2015/0015767 A1 Jan. 15, 2015

(30) Foreign Application Priority Data

Jul. 10, 2013 (CN) .......................... 2013 1 0288528

(51) Int. Cl.
| | | |
|---|---|---|
| G02B 3/02 | (2006.01) |
| G02B 13/18 | (2006.01) |
| G02B 9/60 | (2006.01) |
| G02B 13/00 | (2006.01) |
| G02B 13/04 | (2006.01) |
| H04N 5/225 | (2006.01) |

(52) U.S. Cl.
CPC .............. *G02B 9/60* (2013.01); *G02B 13/0045* (2013.01); *G02B 13/04* (2013.01); *G02B 13/18* (2013.01); *H04N 5/2252* (2013.01); *H04N 5/2254* (2013.01)

(58) Field of Classification Search
CPC ................................. G02B 9/60; G02B 13/18
USPC ............................................ 359/714, 763–770
See application file for complete search history.

(56) References Cited

U.S. PATENT DOCUMENTS

| | | | |
|---|---|---|---|
| 7,480,105 B2 | 1/2009 | Mori | |
| 7,911,712 B2 | 3/2011 | Kitahara | |
| 8,179,614 B1 | 5/2012 | Tsai | |
| 8,248,713 B2 | 8/2012 | Hsieh | |
| 8,284,291 B2 | 10/2012 | Huang | |
| 8,325,429 B2 | 12/2012 | Tang | |
| 8,334,922 B2 | 12/2012 | Shinohara | |
| 8,345,323 B2 | 1/2013 | Otomo | |
| 8,390,941 B2 | 3/2013 | Shinohara | |
| 8,908,289 B2* | 12/2014 | Noda ........................... 359/714 |
| 2010/0254029 A1 | 10/2010 | Shinohara | |
| 2011/0176049 A1* | 7/2011 | Hsieh et al. ................... 348/340 |
| 2011/0316969 A1 | 12/2011 | Hsieh | |
| 2012/0092544 A1 | 4/2012 | Noda | |
| 2012/0147482 A1 | 6/2012 | Tsai | |
| 2012/0154929 A1 | 6/2012 | Tsai | |
| 2012/0218647 A1 | 8/2012 | Yonezawa | |
| 2012/0262806 A1 | 10/2012 | Huang | |

(Continued)

FOREIGN PATENT DOCUMENTS

| | | |
|---|---|---|
| CN | 100555021 C | 10/2009 |
| JP | 2008281760 | 11/2008 |

(Continued)

*Primary Examiner* — William Choi
(74) *Attorney, Agent, or Firm* — Winston Hsu; Scott Margo

(57) ABSTRACT

An optical imaging lens set includes a first lens element to a plastic fifth lens element from an object side toward an image side along an optical axis. The second lens element has an image-side surface with a convex portion in a vicinity of its periphery. The fourth lens element has an image-side surface with a concave portion in a vicinity of the optical axis and a convex portion in a vicinity of its periphery.

12 Claims, 25 Drawing Sheets

(56) References Cited

U.S. PATENT DOCUMENTS

| | | |
|---|---|---|
| 2013/0010374 A1 | 1/2013 | Hsieh |
| 2013/0021680 A1 | 1/2013 | Chen |
| 2013/0050847 A1 | 2/2013 | Hsu |
| 2013/0057967 A1 | 3/2013 | Tang |
| 2013/0107376 A1 | 5/2013 | Tsai |

FOREIGN PATENT DOCUMENTS

| | | | |
|---|---|---|---|
| JP | 4197994 | | 12/2008 |
| JP | 2009294528 | | 12/2009 |
| JP | 2010224521 | | 10/2010 |
| JP | 4858648 | | 1/2012 |
| JP | 5052956 | | 10/2012 |
| JP | 2012211933 | A | 11/2012 |
| JP | 2012211933 | A * | 11/2012 |
| TW | 200722785 | | 6/2007 |
| TW | M369459 | | 11/2009 |
| TW | 201022714 | | 6/2010 |
| TW | 201137430 | | 11/2011 |
| TW | 201321830 | | 6/2013 |

* cited by examiner

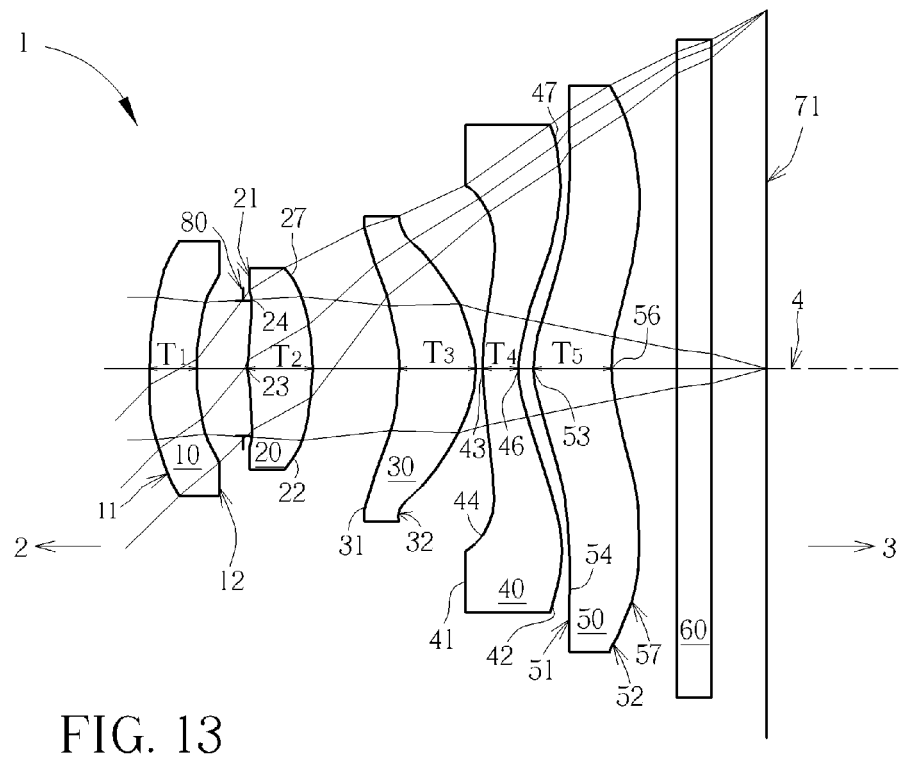
FIG. 13
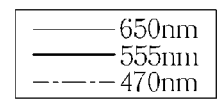
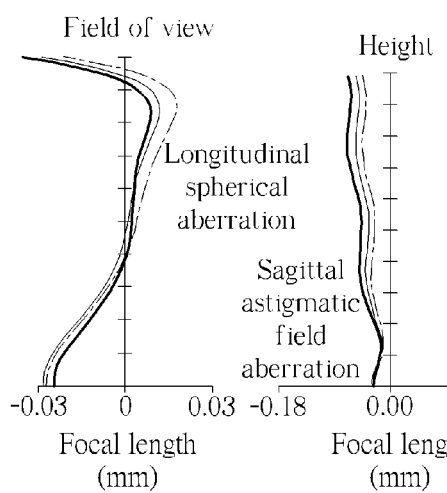
FIG. 14A   FIG. 14B   FIG. 14C   FIG. 14D

| No. | | Curvature Radius | Apc. Stop Distance Lens Thickness Air Gap | Refractive Index | Abbe No. | Focal Length | Material |
|---|---|---|---|---|---|---|---|
| First Example ||||||||
| F= 2.11 mm, HFOV= 46.9 deg., Fno= 2.40 ||||||||
| | Object | Infinity | Infinity | | | | |
| 11 | First Lens | 2.262 | 0.345 $T_1$ | 1.640 | 23.529 | 14.854 | plastic |
| 12 | | 2.785 | 0.095 $G_{12}$ | | | | |
| 80 | Apc. Stop | Infinity | 0.043 | | | | |
| 21 | Second Lens | 33.668 | 0.624 $T_2$ | 1.544 | 56.114 | 3.622 | plastic |
| 22 | | -2.087 | 0.333 $G_{23}$ | | | | |
| 31 | Third Lens | -1.226 | 0.536 $T_3$ | 1.544 | 56.114 | 2.316 | plastic |
| 32 | | -0.719 | 0.049 $G_{34}$ | | | | |
| 41 | Fourth Lens | 2.701 | 0.264 $T_4$ | 1.544 | 56.114 | -1.658 | plastic |
| 42 | | 0.736 | 0.051 $G_{45}$ | | | | |
| 51 | Fifth Lens | 0.644 | 0.388 $T_5$ | 1.535 | 55.635 | 2.492 | plastic |
| 52 | | 0.982 | 0.400 | | | | |
| 60 | IR Filter | Infinity | 0.210 | | | | |
| | IR Filter-Image Plane | Infinity | 0.446 | | | | |
| 71 | Image Plane | Infinity | | | | | |

FIG. 18

| No. | 11 | 12 | 21 | 22 | 31 |
|---|---|---|---|---|---|
| K | -9.788E+00 | 1.070E+01 | 1.000E+02 | 4.285E+00 | -1.978E+00 |
| a4 | 2.714E-01 | 4.384E-01 | 1.824E-01 | 5.886E-02 | 3.455E-02 |
| a6 | 1.429E-02 | 2.441E-01 | -1.185E-01 | 1.039E-01 | 2.833E-01 |
| a8 | 2.240E-01 | 2.032E-01 | -2.160E-01 | -2.371E-01 | -1.882E-02 |
| a10 | -1.684E-01 | 3.128E-01 | -9.667E-01 | -6.613E-01 | -1.547E-01 |
| a12 | -2.362E-01 | -8.744E-01 | -9.295E-01 | -1.332E-01 | - |
| No. | 32 | 41 | 42 | 51 | 52 |
| K | -8.114E-01 | -3.304E+01 | -1.756E+01 | -1.345E+01 | -6.460E+00 |
| a4 | 2.485E-01 | -8.140E-02 | -4.509E-02 | -1.640E-01 | -1.554E-01 |
| a6 | -4.011E-01 | -1.333E-01 | -2.665E-02 | 4.960E-02 | 4.684E-02 |
| a8 | 4.629E-01 | 5.950E-02 | -1.159E-02 | -3.382E-03 | -3.198E-03 |
| a10 | 2.086E-02 | 4.870E-02 | 3.756E-03 | -7.813E-04 | -1.233E-03 |
| a12 | - | -1.082E-01 | 2.742E-03 | 1.233E-04 | -4.581E-05 |
| a14 | - | -1.263E-02 | 4.001E-04 | 8.666E-05 | -1.599E-05 |
| a16 | - | 3.779E-02 | -3.861E-04 | -2.264E-05 | 1.579E-05 |

FIG. 19

| Second Example | | | | | | | |
|---|---|---|---|---|---|---|---|
| F= 2.29 mm, HFOV= 44.6 deg., Fno= 2.59 | | | | | | | |
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 5.295 | 0.336 $T_1$ | 1.640 | 23.529 | 12.073 | plastic |
| 12 | | 16.253 | 0.444 $G_{12}$ | | | | |
| 80 | Ape. Stop | Infinity | 0.128 | | | | |
| 21 | Second Lens | -13.021 | 0.382 $T_2$ | 1.544 | 56.114 | 3.332 | plastic |
| 22 | | -1.589 | 0.411 $G_{23}$ | | | | |
| 31 | Third Lens | -0.807 | 0.534 $T_3$ | 1.544 | 56.114 | 2.104 | plastic |
| 32 | | -0.579 | 0.123 $G_{34}$ | | | | |
| 41 | Fourth Lens | 2.205 | 0.206 $T_4$ | 1.544 | 56.114 | -1.337 | plastic |
| 42 | | 0.596 | 0.131 $G_{45}$ | | | | |
| 51 | Fifth Lens | 0.534 | 0.365 $T_5$ | 1.535 | 55.635 | 2.200 | plastic |
| 52 | | 0.741 | 0.373 | | | | |
| 60 | IR Filter | Infinity | 0.210 | | | | |
| | IR Filter-Image Plane | Infinity | 0.525 | | | | |
| 71 | Image Plane | Infinity | | | | | |

FIG. 20

| No. | 11 | 12 | 21 | 22 | 31 |
|---|---|---|---|---|---|
| K | -6.097E+00 | 2.251E+02 | 2.282E+02 | -4.516E-01 | -2.025E-01 |
| a4 | 1.041E-01 | 2.141E-01 | -1.546E-01 | -2.618E-01 | -2.203E-01 |
| a6 | -3.652E-02 | -2.306E-01 | -7.662E-01 | 2.668E-01 | 2.512E-01 |
| a8 | -2.646E-03 | 7.547E-02 | -5.907E-01 | -1.101E+00 | 1.424E+00 |
| a10 | 3.838E-02 | 3.767E-01 | 5.812E-01 | 1.420E-01 | -1.077E+00 |
| a12 | -1.978E-02 | -1.873E-01 | -3.313E-01 | 4.879E-01 | 5.792E-01 |
| a14 | 1.707E-02 | -4.607E-01 | -1.329E+01 | -1.568E+00 | 4.824E-03 |
| a16 | -1.368E-02 | 3.069E-01 | - | - | - |
| No. | 32 | 41 | 42 | 51 | 52 |
| K | -6.779E-01 | -1.171E+02 | -1.339E+01 | -8.629E+00 | -6.257E+00 |
| a4 | 1.915E-01 | -1.280E-02 | -2.431E-02 | -1.144E-01 | -1.256E-01 |
| a6 | -2.148E-03 | -2.618E-02 | -2.843E-02 | 2.831E-02 | 3.942E-02 |
| a8 | -7.499E-02 | -7.207E-02 | 4.447E-03 | -8.364E-03 | -6.798E-03 |
| a10 | 2.729E-01 | 9.865E-02 | -1.050E-03 | -4.527E-04 | -4.098E-04 |
| a12 | 2.370E-01 | -6.971E-02 | 5.058E-04 | 7.448E-04 | 1.736E-04 |
| a14 | -9.103E-03 | 1.931E-02 | 3.599E-04 | 1.323E-04 | -3.324E-05 |
| a16 | - | -4.691E-04 | -1.317E-04 | -6.767E-05 | 9.364E-06 |

FIG. 21

| Third Example ||||||||
|---|---|---|---|---|---|---|---|
| F= 2.08 mm, HFOV= 47.4 deg., Fno= 2.43 ||||||||
| No. | | Curvature Radius | Apc. Stop Distance Lens Thickness Air Gap | Refractive Index | Abbe No. | Focal Length | Material |
| | Object | Infinity | Infinity | | | | |
| 11 | First Lens | 10.180 | 0.363 $T_1$ | 1.640 | 23.529 | 35.370 | plastic |
| 12 | | 18.135 | 0.466 $G_{12}$ | | | | |
| 80 | Apc. Stop | Infinity | 0.052 | | | | |
| 21 | Second Lens | 28.153 | 0.471 $T_2$ | 1.544 | 56.114 | 2.990 | plastic |
| 22 | | -1.723 | 0.388 $G_{23}$ | | | | |
| 31 | Third Lens | -1.354 | 0.505 $T_3$ | 1.544 | 56.114 | 2.228 | plastic |
| 32 | | -0.725 | 0.060 $G_{34}$ | | | | |
| 41 | Fourth Lens | 3.698 | 0.260 $T_4$ | 1.544 | 56.114 | -1.582 | plastic |
| 42 | | 0.777 | 0.065 $G_{45}$ | | | | |
| 51 | Fifth Lens | 0.651 | 0.350 $T_5$ | 1.535 | 55.635 | 2.824 | plastic |
| 52 | | 0.928 | 0.400 | | | | |
| 60 | IR Filter | Infinity | 0.210 | | | | |
| | IR Filter- Image Plane | Infinity | 0.446 | | | | |
| 71 | Image Plane | Infinity | | | | | |

FIG. 22

| No. | 11 | 12 | 21 | 22 | 31 |
|---|---|---|---|---|---|
| K | -2.167E+01 | -7.982E+01 | -4.125E+01 | 4.253E+00 | -3.592E-01 |
| a4 | 2.066E-01 | 3.711E-01 | -9.770E-02 | -4.449E-02 | -6.075E-02 |
| a6 | -1.129E-01 | -2.501E-01 | -3.612E-01 | 3.707E-02 | 1.853E-01 |
| a8 | 1.482E-01 | 3.379E-01 | -2.222E-01 | -2.645E-01 | -2.350E-02 |
| a10 | -1.022E-01 | -1.769E-01 | -1.269E+00 | -3.432E-01 | - |
| a12 | 4.590E-02 | 2.173E-01 | -1.212E+00 | -2.143E-01 | - |
| No. | 32 | 41 | 42 | 51 | 52 |
| K | -7.935E-01 | -8.495E+01 | -2.128E+01 | -1.407E+01 | -6.428E+00 |
| a4 | 2.459E-01 | -1.005E-01 | -6.419E-02 | -1.679E-01 | -1.598E-01 |
| a6 | -4.068E-01 | -1.392E-01 | -2.542E-02 | 4.892E-02 | 4.659E-02 |
| a8 | 4.386E-01 | 5.390E-02 | -1.098E-02 | -3.523E-03 | -3.221E-03 |
| a10 | - | 4.624E-02 | 3.697E-03 | -8.107E-04 | -1.239E-03 |
| a12 | - | -1.078E-01 | 2.626E-03 | 1.211E-04 | -4.382E-05 |
| a14 | - | -1.098E-02 | 3.431E-04 | 8.885E-05 | -1.283E-05 |
| a16 | - | 3.949E-02 | -4.106E-04 | -2.060E-05 | 1.756E-05 |

FIG. 23

| Fourth Example | | | | | | |
|---|---|---|---|---|---|---|
| F= 2.06 mm, HFOV= 47.7 deg., Fno= 2.40 | | | | | | |
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 6.026 | 0.399 $T_1$ | 1.640 | 23.529 | 23.868 | plastic |
| 12 | | 9.648 | 0.292 $G_{12}$ | | | | |
| 80 | Ape. Stop | Infinity | 0.047 | | | | |
| 21 | Second Lens | 14.349 | 0.800 $T_2$ | 1.544 | 56.114 | 3.185 | plastic |
| 22 | | -1.939 | 0.248 $G_{23}$ | | | | |
| 31 | Third Lens | -1.388 | 0.466 $T_3$ | 1.544 | 56.114 | 2.187 | plastic |
| 32 | | -0.718 | 0.060 $G_{34}$ | | | | |
| 41 | Fourth Lens | 2.712 | 0.260 $T_4$ | 1.544 | 56.114 | -1.619 | plastic |
| 42 | | 0.725 | 0.065 $G_{45}$ | | | | |
| 51 | Fifth Lens | 0.641 | 0.321 $T_5$ | 1.535 | 55.635 | 3.027 | plastic |
| 52 | | 0.875 | 0.400 | | | | |
| 60 | IR Filter | Infinity | 0.210 | | | | |
| | IR Filter-Image Plane | Infinity | 0.467 | | | | |
| 71 | Image Plane | Infinity | | | | | |

FIG. 24

| No. | 11 | 12 | 21 | 22 | 31 |
|---|---|---|---|---|---|
| K | -2.430E+01 | 1.908E+01 | 1.012E+02 | 3.809E+00 | -4.134E-01 |
| a4 | 2.052E-01 | 3.691E-01 | -6.267E-02 | -6.192E-02 | -4.880E-02 |
| a6 | -1.027E-01 | -2.508E-01 | -2.980E-01 | 3.746E-02 | 1.758E-01 |
| a8 | 1.481E-01 | 3.085E-01 | -2.052E-01 | -2.197E-01 | -1.097E-01 |
| a10 | -1.071E-01 | -2.020E-01 | -5.573E-01 | -3.142E-01 | - |
| a12 | 4.833E-02 | 5.458E-02 | -9.034E-01 | -2.306E-02 | - |
| No. | 32 | 41 | 42 | 51 | 52 |
| K | -8.130E-01 | -6.140E+01 | -1.949E+01 | -1.444E+01 | -5.851E+00 |
| a4 | 2.497E-01 | -9.532E-02 | -5.601E-02 | -1.672E-01 | -1.599E-01 |
| a6 | -3.950E-01 | -1.375E-01 | -2.561E-02 | 4.900E-02 | 4.644E-02 |
| a8 | 4.637E-01 | 5.451E-02 | -1.118E-02 | -3.520E-03 | -3.253E-03 |
| a10 | - | 4.635E-02 | 3.651E-03 | -8.154E-04 | -1.244E-03 |
| a12 | - | -1.079E-01 | 2.623E-03 | 1.176E-04 | -4.517E-05 |
| a14 | - | -1.111E-02 | 3.466E-04 | 8.696E-05 | -1.329E-05 |
| a16 | - | 3.942E-02 | -4.079E-04 | -2.149E-05 | 1.737E-05 |

FIG. 25

| | | | Fifth Example | | | | |
|---|---|---|---|---|---|---|---|
| | | | F= 2.04 mm, HFOV= 47.9 deg., Fno= 2.40 | | | | |
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 3.043 | 0.447 $T_1$ | 1.640 | 23.529 | 44.386 | plastic |
| 12 | | 3.210 | 0.297 $G_{12}$ | | | | |
| 80 | Ape. Stop | Infinity | 0.045 | | | | |
| 21 | Second Lens | 10.178 | 0.610 $T_2$ | 1.544 | 56.114 | 3.110 | plastic |
| 22 | | -1.995 | 0.209 $G_{23}$ | | | | |
| 31 | Third Lens | -1.228 | 0.564 $T_3$ | 1.544 | 56.114 | 2.375 | plastic |
| 32 | | -0.733 | 0.049 $G_{34}$ | | | | |
| 41 | Fourth Lens | 2.591 | 0.335 $T_4$ | 1.544 | 56.114 | -1.708 | plastic |
| 42 | | 0.734 | 0.071 $G_{45}$ | | | | |
| 51 | Fifth Lens | 0.631 | 0.343 $T_5$ | 1.535 | 55.635 | 2.537 | plastic |
| 52 | | 0.954 | 0.400 | | | | |
| 60 | IR Filter | Infinity | 0.210 | | | | |
| | IR Filter- Image Plane | Infinity | 0.458 | | | | |
| 71 | Image Plane | Infinity | | | | | |

FIG. 26

| No. | 11 | 12 | 21 | 22 | 31 |
|---|---|---|---|---|---|
| K | -1.938E+01 | -1.325E+01 | 9.350E+01 | 5.001E+00 | -1.731E+00 |
| a4 | 2.278E-01 | 3.974E-01 | -6.651E-02 | 5.437E-03 | 2.229E-02 |
| a6 | -7.873E-02 | -7.732E-02 | -2.906E-01 | 1.925E-01 | 2.683E-01 |
| a8 | 1.430E-01 | 1.960E-01 | -4.240E-02 | -1.861E-01 | -5.350E-02 |
| a10 | -1.150E-01 | -1.915E-02 | -6.318E-01 | -7.507E-01 | -3.318E-01 |
| a12 | 6.914E-02 | 7.472E-02 | -9.522E-01 | -2.035E-01 | - |
| No. | 32 | 41 | 42 | 51 | 52 |
| K | -7.925E-01 | -2.531E+01 | -1.649E+01 | -1.191E+01 | -6.057E+00 |
| a4 | 2.439E-01 | -8.353E-02 | -4.802E-02 | -1.657E-01 | -1.580E-01 |
| a6 | -4.136E-01 | -1.445E-01 | -2.701E-02 | 5.016E-02 | 4.703E-02 |
| a8 | 4.423E-01 | 5.161E-02 | -1.157E-02 | -3.416E-03 | -2.901E-03 |
| a10 | -1.926E-03 | 4.829E-02 | 3.733E-03 | -8.035E-04 | -1.182E-03 |
| a12 | - | -1.063E-01 | 2.637E-03 | 1.330E-04 | -4.012E-05 |
| a14 | - | -1.230E-02 | 3.379E-04 | 9.229E-05 | -1.472E-05 |
| a16 | - | 3.910E-02 | -3.663E-04 | -2.469E-05 | 1.650E-05 |

FIG. 27

| Sixth Example ||||||||
|---|---|---|---|---|---|---|---|
| F= 2.12 mm, HFOV= 46.9 deg., Fno= 2.42 ||||||||
| No. | | Curvature Radius | Ape. Stop Distance Lens Thickness Air Gap | Refractive Index | Abbe No. | Focal Length | Material |
| | Object | Infinity | Infinity | | | | |
| 11 | First Lens | 3.055 | 0.253 $T_1$ | 1.640 | 23.529 | 28.262 | plastic |
| 12 | | 3.551 | 0.224 $G_{12}$ | | | | |
| 80 | Ape. Stop | Infinity | 0.044 | | | | |
| 21 | Second Lens | 20.810 | 0.387 $T_2$ | 1.544 | 56.114 | 3.499 | plastic |
| 22 | | -2.089 | 0.456 $G_{23}$ | | | | |
| 31 | Third Lens | -1.308 | 0.540 $T_3$ | 1.544 | 56.114 | 2.288 | plastic |
| 32 | | -0.732 | 0.060 $G_{34}$ | | | | |
| 41 | Fourth Lens | 2.735 | 0.260 $T_4$ | 1.544 | 56.114 | -1.640 | plastic |
| 42 | | 0.734 | 0.065 $G_{45}$ | | | | |
| 51 | Fifth Lens | 0.645 | 0.393 $T_5$ | 1.535 | 55.635 | 2.449 | plastic |
| 52 | | 0.998 | 0.400 | | | | |
| 60 | IR Filter | Infinity | 0.210 | | | | |
| | IR Filter-Image Plane | Infinity | 0.448 | | | | |
| 71 | Image Plane | Infinity | | | | | |

FIG. 28

| No. | 11 | 12 | 21 | 22 | 31 |
|---|---|---|---|---|---|
| K | -8.707E+00 | 1.239E+01 | -1.002E+02 | 5.331E+00 | -1.525E+00 |
| a4 | 2.747E-01 | 4.425E-01 | 1.080E-01 | 7.059E-02 | 2.033E-02 |
| a6 | 7.073E-03 | 2.355E-01 | -1.675E-01 | 1.294E-01 | 2.844E-01 |
| a8 | 2.013E-01 | -3.133E-01 | -2.057E-01 | -2.115E-01 | 5.880E-03 |
| a10 | -2.165E-01 | -2.281E-01 | -1.492E+00 | -1.483E+00 | -1.261E-01 |
| a12 | -4.209E-01 | -1.637E+00 | -1.635E+00 | 5.683E-02 | - |
| No. | 32 | 41 | 42 | 51 | 52 |
| K | -8.003E-01 | -3.284E+01 | -1.737E+01 | -1.325E+01 | -6.468E+00 |
| a4 | 2.406E-01 | -7.670E-02 | -4.395E-02 | -1.634E-01 | -1.551E-01 |
| a6 | -4.008E-01 | -1.346E-01 | -2.660E-02 | 4.975E-02 | 4.691E-02 |
| a8 | 4.646E-01 | 6.079E-02 | -1.170E-02 | -3.353E-03 | -3.194E-03 |
| a10 | 2.155E-02 | 5.088E-02 | 3.695E-03 | -7.800E-04 | -1.234E-03 |
| a12 | - | -1.071E-01 | 2.718E-03 | 1.196E-04 | -4.611E-05 |
| a14 | - | -1.284E-02 | 3.941E-04 | 8.498E-05 | -1.538E-05 |
| a16 | - | 3.668E-02 | -3.872E-04 | -2.326E-05 | 1.608E-05 |

FIG. 29

| No. | | Curvature Radius | Ape. Stop Distance Lens Thickness Air Gap | Refractive Index | Abbe No. | Focal Length | Material |
|---|---|---|---|---|---|---|---|
| | Seventh Example |
| | F= 2.07 mm, HFOV= 47.5 deg., Fno= 2.40 |
| | Object | Infinity | Infinity | | | | |
| 11 | First Lens | 2.665 | 0.294 $T_1$ | 1.640 | 23.529 | -16.020 | plastic |
| 12 | | 2.027 | 0.278 $G_{12}$ | | | | |
| 80 | Ape. Stop | Infinity | 0.047 | | | | |
| 21 | Second Lens | 15.104 | 0.381 $T_2$ | 1.544 | 56.114 | 2.752 | plastic |
| 22 | | -1.654 | 0.524 $G_{23}$ | | | | |
| 31 | Third Lens | -1.352 | 0.470 $T_3$ | 1.544 | 56.114 | 2.379 | plastic |
| 32 | | -0.744 | 0.047 $G_{34}$ | | | | |
| 41 | Fourth Lens | 2.130 | 0.219 $T_4$ | 1.544 | 56.114 | -1.736 | plastic |
| 42 | | 0.704 | 0.093 $G_{45}$ | | | | |
| 51 | Fifth Lens | 0.667 | 0.476 $T_5$ | 1.535 | 55.635 | 2.539 | plastic |
| 52 | | 0.982 | 0.400 | | | | |
| 60 | IR Filter | Infinity | 0.210 | | | | |
| | IR Filter-Image Plane | Infinity | 0.446 | | | | |
| 71 | Image Plane | Infinity | | | | | |

FIG. 30

| No. | 11 | 12 | 21 | 22 | 31 |
|---|---|---|---|---|---|
| K | -9.817E+00 | 7.738E+00 | -9.688E+03 | 4.300E+00 | -8.415E-01 |
| a4 | 2.697E-01 | 3.572E-01 | 6.527E-02 | -1.492E-02 | -1.085E-02 |
| a6 | -1.229E-02 | -6.285E-02 | -6.796E-01 | -8.282E-02 | 1.992E-01 |
| a8 | 1.140E-01 | -2.005E-02 | -1.639E+00 | -4.149E-01 | 3.351E-02 |
| a10 | -2.911E-01 | 1.389E-01 | -1.439E+00 | 5.224E-01 | -4.758E-02 |
| a12 | 3.682E-02 | -5.539E+00 | 1.977E+01 | -3.243E+00 | - |
| No. | 32 | 41 | 42 | 51 | 52 |
| K | -8.017E-01 | -5.374E+00 | -6.702E+00 | -6.588E+00 | -6.460E+00 |
| a4 | 2.368E-01 | -9.593E-02 | -3.660E-02 | -1.565E-01 | -1.578E-01 |
| a6 | -4.003E-01 | -1.474E-01 | -2.042E-02 | 5.097E-02 | 4.782E-02 |
| a8 | 4.660E-01 | 8.423E-02 | -1.011E-02 | -2.747E-03 | -2.814E-03 |
| a10 | -1.856E-02 | 7.019E-02 | 3.702E-03 | -6.259E-04 | -1.138E-03 |
| a12 | - | -1.080E-01 | 2.523E-03 | 1.286E-04 | -3.560E-05 |
| a14 | - | -2.051E-02 | 2.884E-04 | 6.203E-05 | -1.806E-05 |
| a16 | - | 3.249E-02 | -4.165E-04 | -4.401E-05 | 1.563E-05 |

FIG. 31

| | Example 1 | Example 2 | Example 3 | Example 4 | Example 5 | Example 6 | Example 7 |
|---|---|---|---|---|---|---|---|
| $V_{D1}$ | 23.529 | 23.529 | 23.529 | 23.529 | 23.529 | 23.529 | 23.529 |
| $V_{D2}$ | 56.114 | 56.114 | 56.114 | 56.114 | 56.114 | 56.114 | 56.114 |
| $T_4/G_{12}$ | 1.906 | 0.360 | 0.501 | 0.767 | 0.981 | 0.971 | 0.673 |
| $E_{fl}/T_2$ | 3.382 | 5.998 | 4.417 | 2.574 | 3.342 | 5.477 | 5.435 |
| $T_2/T_4$ | 2.361 | 1.852 | 1.811 | 3.078 | 1.823 | 1.489 | 1.741 |
| $T_1/G_{12}$ | 2.490 | 0.587 | 0.699 | 1.177 | 1.308 | 0.944 | 0.904 |
| $T_{max}/G_{12}$ | 4.501 | 0.933 | 0.973 | 2.360 | 1.788 | 2.016 | 1.463 |
| $T_{max}/T_2$ | 1.000 | 1.398 | 1.072 | 1.000 | 1.000 | 1.394 | 1.250 |
| $G_{aa}/T_1$ | 1.654 | 3.682 | 2.844 | 1.783 | 1.501 | 3.358 | 3.368 |
| $T_1/T_2$ | 0.553 | 0.880 | 0.770 | 0.499 | 0.732 | 0.653 | 0.772 |
| $G_{aa}/T_4$ | 2.161 | 6.000 | 3.966 | 2.737 | 2.003 | 3.264 | 4.527 |
| $V_{D2}-V_{D1}$ | 32.586 | 32.586 | 32.586 | 32.586 | 32.586 | 32.586 | 32.586 |

FIG. 32

OPTICAL IMAGING LENS AND ELECTRONIC DEVICE COMPRISING THE SAME

CROSS REFERENCE TO RELATED APPLICATION

This application claims priority to China Application No. 201310288528.9, filed on Jul. 10, 2013.

BACKGROUND OF THE INVENTION

1. Field of the Invention

The present invention generally relates to an optical imaging lens set and an electronic device which includes such optical imaging lens set. Specifically speaking, the present invention is directed to an optical imaging lens set of five lens elements and an electronic device which includes such optical imaging lens set of five lens elements.

2. Description of the Prior Art

In recent years, the popularity of mobile phones and digital cameras makes the photography modules of various portable electronic products, such as optical imaging lens elements or an image sensor . . . develop quickly, and the shrinkage of mobile phones and digital cameras also makes a greater and greater demand for the miniaturization of the photography module. The current trend of research is to develop an optical imaging lens set of a shorter length with uncompromised good quality.

With the development and shrinkage of a charge coupled device (CCD) or a complementary metal oxide semiconductor element (CMOS), the optical imaging lens set installed in the photography module shrinks to meet the demands as well. However, good and necessary optical properties, such as the system aberration improvement, as well as production cost and production feasibility should be taken into consideration, too.

For example, JP 4197994, JP 2008-281760, TW M-369459, TW 200722785, US 2010-0254029 and U.S. Pat. No. 8,248,713 all disclose an optical imaging lens set made of five lens elements. However, the total length of the optical imaging lens set is longer than 9 mm so they are disadvantageous for a smaller design.

These disclosed dimensions do not show good examples of the shrinkage of portable electronic products, such as mobile phones and digital cameras. It is still a problem, on one hand, to reduce the system length efficiently and, on the other hand, to maintain a sufficient optical performance in this field.

SUMMARY OF THE INVENTION

In the light of the above, the present invention is capable of proposing an optical imaging lens set of lightweight, low production cost, reduced length, high resolution and high image quality. The optical imaging lens set of five lens elements of the present invention has a first lens element, a second lens element, a third lens element, a fourth lens element and a fifth lens element sequentially from an object side to an image side along an optical axis.

The second lens element has an image-side surface facing toward the image side and the image-side surface has a convex portion in a vicinity of a circular periphery of the second lens element. The fourth lens element has an image-side surface facing toward the image side and the image-side surface has a concave portion in a vicinity of the optical axis and a convex portion in a vicinity of a circular periphery of the fourth lens element. The fifth lens element is made of plastic.

The optical imaging lens set exclusively has five lens elements with refractive power. Each one of the first lens element, the second lens element, the third lens element, the fourth lens element, and the fifth lens element has an object-side surface facing toward said object side and an image-side surface facing toward said image side.

In the optical imaging lens set of five lens elements of the present invention, the first lens element has a first lens element thickness $T_1$ along the optical axis, the second lens element has a second lens element thickness $T_2$ along the optical axis, the third lens element has a third lens element thickness $T_3$ along the optical axis, the fourth lens element has a fourth lens element thickness $T_4$ along the optical axis, and the fifth lens element has a fifth lens element thickness $T_5$ along the optical axis, the total thickness of all the lens elements in the optical imaging lens set along the optical axis is $T_{al}=T_1+T_2+T_3+T_4+T_5$.

In the optical imaging lens set of five lens elements of the present invention, an air gap $G_{12}$ is disposed between the first lens element and the second lens element, an air gap $G_{23}$ is disposed between the second lens element and the third lens element, an air gap $G_{34}$ is disposed between the third lens element and the fourth lens element, an air gap $G_{45}$ is disposed between the fourth lens element and the fifth lens element, the sum of total four air gaps between adjacent lens elements from the first lens element to the fifth lens element along the optical axis is $G_{aa}=G_{12}+G_{23}+G_{34}+G_{45}$.

In the optical imaging lens set of five lens elements of the present invention, a thickness $T_4$ of the fourth lens element along the optical axis and an air gap $G_{12}$ between the first lens element and the second lens element along the optical axis satisfy a relationship $T_4/G_{12} \leq 2.0$.

In the optical imaging lens set of five lens elements of the present invention, a focal length $E_{fl}$ of the optical imaging lens set and an a thickness $T_2$ of the second lens element along the optical axis satisfy a relationship $3.0 \leq (E_{fl}/T_2) \leq 7.0$.

In the optical imaging lens set of five lens elements of the present invention, a thickness $T_1$ of the first lens element along the optical axis and an air gap $G_{12}$ between the first lens element and the second lens element along the optical axis satisfy a relationship $T_1/G_{12} \leq 2.5$.

In the optical imaging lens set of five lens elements of the present invention, a thickness $T_2$ of the second lens element along the optical axis and a thickness $T_4$ of the fourth lens element along the optical axis satisfy a relationship $1.4 \leq (T_2/T_4) \leq 3.5$.

In the optical imaging lens set of five lens elements of the present invention, a focal length $E_{fl}$ of the optical imaging lens set and a thickness $T_2$ of the second lens element along the optical axis satisfy a relationship $(E_{fl}/T_2) \leq 7.0$.

In the optical imaging lens set of five lens elements of the present invention, a maximal thickness $T_{max}$ among the five lens elements along the optical axis and an air gap $G_{12}$ between the first lens element and the second lens element along the optical axis satisfy a relationship $0.7 \leq (T_{max}/G_{12}) \leq 2.3$.

In the optical imaging lens set of five lens elements of the present invention, a thickness $T_1$ of the first lens element along the optical axis and an air gap $G_{12}$ between the first lens element and the second lens element along the optical axis satisfy a relationship $0.5 \leq T_1/G_{12} \leq 2.5$.

In the optical imaging lens set of five lens elements of the present invention, a maximal thickness $T_{max}$ among the five lens elements along the optical axis and a thickness $T_2$ of the second lens element along the optical axis satisfy a relationship $T_{max}/T_2 \leq 1.4$.

In the optical imaging lens set of five lens elements of the present invention, a thickness $T_1$ of the first lens element along the optical axis and the sum of all four air gaps $G_{aa}$ between each lens element from the first lens element to the fifth lens element along the optical axis satisfy a relationship $1.5 \leq G_{aa}/T_1 \leq 4.0$.

In the optical imaging lens set of five lens elements of the present invention, a thickness $T_2$ of the second lens element along the optical axis satisfies a relationship $T_1/T_2 \leq 1.1$.

In the optical imaging lens set of five lens elements of the present invention, a thickness $T_4$ of the fourth lens element along the optical axis and the sum of all four air gaps $G_{aa}$ between each lens element from the first lens element to the fifth lens element along the optical axis satisfies a relationship $2.0 \leq G_{aa}/T_4 \leq 8.0$.

In the optical imaging lens set of five lens elements of the present invention, a thickness $T_2$ of the second lens element along the optical axis satisfies a relationship $1.4 \leq T_2/T_4$.

In the optical imaging lens set of five lens elements of the present invention, an Abbe number $VD_1$ of the first lens element and an Abbe number $VD_2$ of the second lens element satisfy a relationship $30 \leq VD_2 - VD_1$.

The present invention also proposes an electronic device which includes the optical imaging lens set as described above. The electronic device includes a case and an image module disposed in the case. The image module includes an optical imaging lens set as described above, a barrel for the installation of the optical imaging lens set, a module housing unit for the installation of the barrel, and an image sensor disposed at an image side of the optical imaging lens set.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 13 illustrates a seventh example of the optical imaging lens set of five lens elements of the present invention.

FIG. 14A illustrates the longitudinal spherical aberration on the image plane of the seventh example.

FIG. 14B illustrates the astigmatic aberration on the sagittal direction of the seventh example.

FIG. 14C illustrates the astigmatic aberration on the tangential direction of the seventh example.

FIG. 14D illustrates the distortion aberration of the seventh example.

FIG. 18 shows the optical data of the first example of the optical imaging lens set.

FIG. 19 shows the aspheric surface data of the first example.

FIG. 20 shows the optical data of the second example of the optical imaging lens set.

FIG. 21 shows the aspheric surface data of the second example.

FIG. 22 shows the optical data of the third example of the optical imaging lens set.

FIG. 23 shows the aspheric surface data of the third example.

FIG. 24 shows the optical data of the fourth example of the optical imaging lens set.

FIG. 25 shows the aspheric surface data of the fourth example.

FIG. 26 shows the optical data of the fifth example of the optical imaging lens set.

FIG. 27 shows the aspheric surface data of the fifth example.

FIG. 28 shows the optical data of the sixth example of the optical imaging lens set.

FIG. 29 shows the aspheric surface data of the sixth example.

FIG. 30 shows the optical data of the seventh example of the optical imaging lens set.

FIG. 31 shows the aspheric surface data of the seventh example.

FIG. 32 shows some important ratios in the examples.

DETAILED DESCRIPTION

Figure 15:
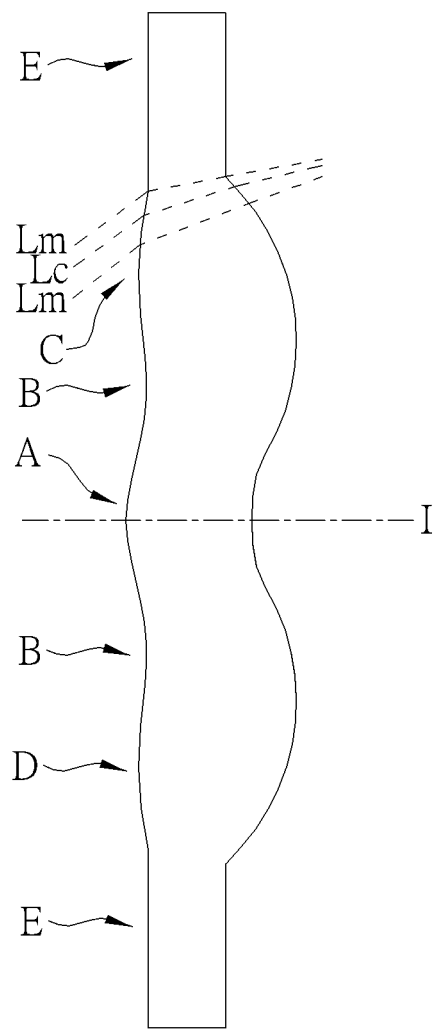
FIG. 15 illustrates exemplificative shapes of the optical imaging lens element of the present invention.

Before the detailed description of the present invention, the first thing to be noticed is that in the present invention, similar (not necessarily identical) elements share the same numeral references. In the entire present specification, "a certain lens element has negative/positive refractive power" refers to the part in a vicinity of the optical axis of the lens element has negative/positive refractive power. "An object-side/image-side surface of a certain lens element has a concave/convex part or concave/convex portion" refers to the part is more concave/convex in a direction parallel with the optical axis to be compared with an outer region next to the region. Take FIG. 15 for example, the optical axis is "I" and the lens element is symmetrical with respect to the optical axis I. The object side of the lens element has a convex part in the region A, a concave part in the region B, and a convex part in the region C because region A is more convex in a direction parallel with the optical axis than an outer region (region B) next to region A, region B is more concave than region C and region C is similarly more convex than region E. "A circular periphery of a certain lens element" refers to a circular periphery region of a surface on the lens element for light to pass through, that is, region C in the drawing. In the drawing, imaging light includes Lc (chief ray) and Lm (marginal ray). "A vicinity of the optical axis" refers to an optical axis region of a surface on the lens element for light to pass through, that is, the region A in FIG. 15. In addition, the lens element may include an extension part E for the lens element to be installed in an optical imaging lens set. Ideally speaking, no light would pass through the extension part, and the actual structure and shape of the extension part is not limited to this and may have other variations. For the reason of simplicity, the extension part is not illustrated in FIGS. 1, 3, 5, 7, 9, 11 and 13.

Figure 1:
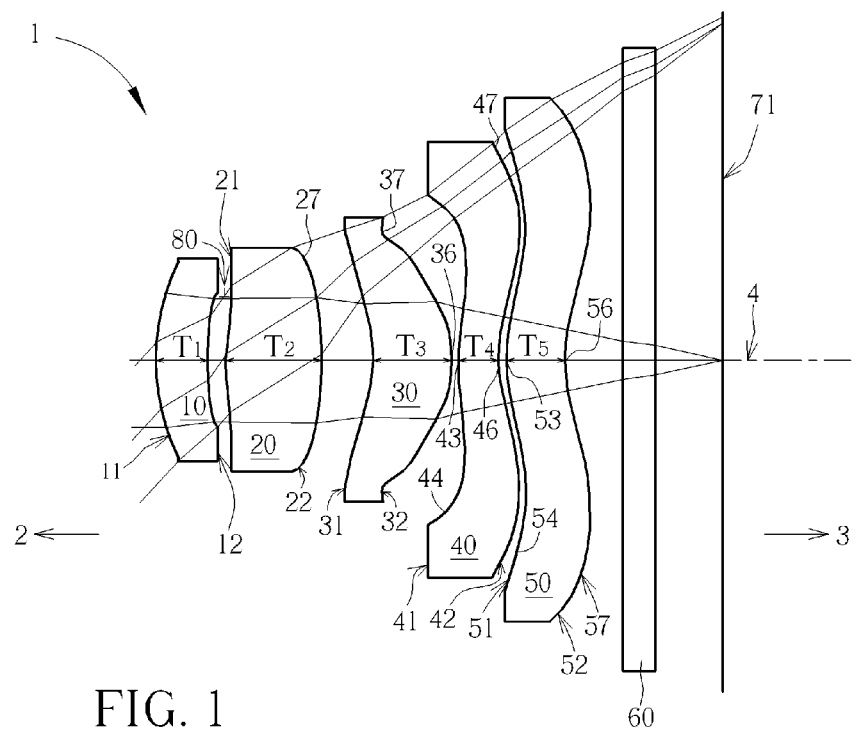
FIG. 1 illustrates a first example of the optical imaging lens set of the present invention.

As shown in FIG. 1, the optical imaging lens set 1 of five lens elements of the present invention, sequentially from an object side 2 (where an object is located) to an image side 3 along an optical axis 4, has a first lens element 10, a second lens element 20, a third lens element 30, a fourth lens element 40, a fifth lens element 50, a filter 60 and an image plane 71. Generally speaking, the first lens element 10, the second lens element 20, the third lens element 30, the fourth lens element 40 and the fifth lens element 50 may be made of a transparent plastic material and each has an appropriate refractive power, but the present invention is not limited to this and the fifth lens element 50 is always made of a transparent plastic material. There are exclusively five lens elements with refractive power in the optical imaging lens set 1 of the present invention. The optical axis 4 is the optical axis of the entire optical imaging lens set 1, and the optical axis of each of the lens elements coincides with the optical axis of the optical imaging lens set 1.

Furthermore, the optical imaging lens set 1 includes an aperture stop (ape. stop) 80 disposed in an appropriate position. In FIG. 1, the aperture stop 80 is disposed between the first lens element 10 and the second lens element 20. When light emitted or reflected by an object (not shown) which is located at the object side 2 enters the optical imaging lens set 1 of the present invention, it forms a clear and sharp image on the image plane 71 at the image side 3 after passing through the first lens element 10, the aperture stop 80, the second lens element 20, the third lens element 30, the fourth lens element 40, the fifth lens element 50 and the filter 60.

In the embodiments of the present invention, the optional filter 60 may be a filter of various suitable functions, for example, the filter 60 may be an infrared cut filter (IR cut filter), placed between the fifth lens element 50 and the image plane 71.

Each lens element in the optical imaging lens set 1 of the present invention has an object-side surface facing toward the object side 2 as well as an image-side surface facing toward the image side 3. In addition, each object-side surface and image-side surface in the optical imaging lens set 1 of the present invention has a part in a vicinity of its circular periphery (circular periphery part) away from the optical axis 4 as well as a part in a vicinity of the optical axis (optical axis part) closer to the optical axis 4. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42; the fifth lens element 50 has an object-side surface 51 and an image-side surface 52.

Each lens element in the optical imaging lens set 1 of the present invention further has a central thickness T on the optical axis 4. For example, the first lens element 10 has a first lens element thickness $T_1$, the second lens element 20 has a second lens element thickness $T_2$, the third lens element 30 has a third lens element thickness $T_3$, the fourth lens element 40 has a fourth lens element thickness $T_4$, and the fifth lens element 50 has a fifth lens element thickness $T_5$. Therefore, the total thickness of all the lens elements in the optical imaging lens set 1 along the optical axis 4 is $T_{a1}=T_1+T_2+T_3+T_4+T_5$. At least one of the five lens elements has a maximal thickness $T_{max}$ among all along the optical axis.

In addition, between two adjacent lens elements in the optical imaging lens set 1 of the present invention there is an air gap G along the optical axis 4. For example, an air gap $G_{12}$ is disposed between the first lens element 10 and the second lens element 20, an air gap $G_{23}$ is disposed between the second lens element 20 and the third lens element 30, an air gap $G_{34}$ is disposed between the third lens element 30 and the fourth lens element 40, an air gap $G_{45}$ is disposed between the fourth lens element 40 and the fifth lens element 50. Therefore, the sum of total four air gaps between adjacent lens elements from the first lens element 10 to the fifth lens element 50 along the optical axis 4 is $G_{aa}=G_{12}+G_{23}+G_{34}+G_{45}$.

First Example

Figures 2A, 2B, 2C, 2D:
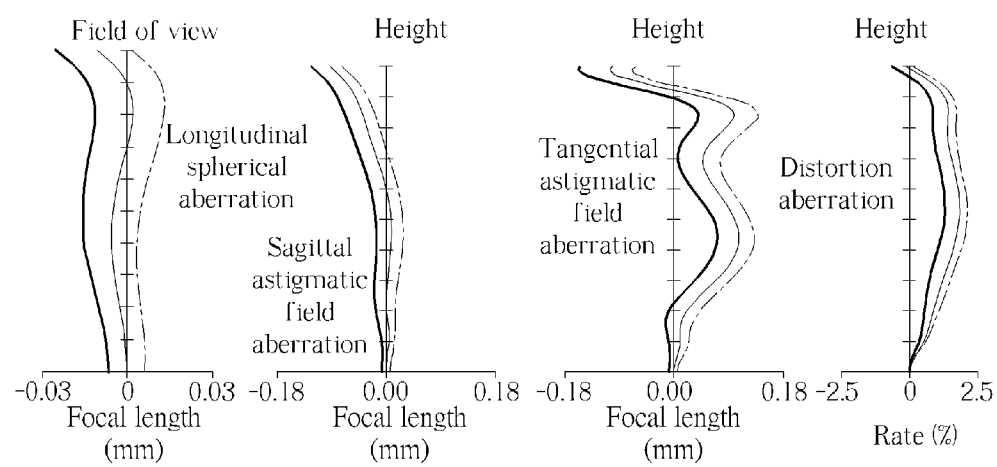
FIG. 2A illustrates the longitudinal spherical aberration on the image plane of the first example.
FIG. 2B illustrates the astigmatic aberration on the sagittal direction of the first example.
FIG. 2C illustrates the astigmatic aberration on the tangential direction of the first example.
FIG. 2D illustrates the distortion aberration of the first example.

Please refer to FIG. 1 which illustrates the first example of the optical imaging lens set 1 of the present invention. Please refer to FIG. 2A for the longitudinal spherical aberration on the image plane 71 of the first example; please refer to FIG. 2B for the astigmatic field aberration on the sagittal direction; please refer to FIG. 2C for the astigmatic field aberration on the tangential direction, and please refer to FIG. 2D for the distortion aberration. The Y axis of the spherical aberration in each example is "field of view" for 1.0. The Y axis of the astigmatic field and the distortion in each example stands for "image height".

The optical imaging lens set 1 of the first example has five lens elements 10 to 50; each is made of a plastic material and has refractive power. The optical imaging lens set 1 also has a filter 60, an aperture stop 80, and an image plane 71. The aperture stop 80 is provided between the first lens element 10 and the second lens element 20. The filter 60 may be an infrared filter (IR cut filter) to prevent inevitable infrared in light reaching the image plane to adversely affect the imaging quality.

The first lens element 10 has positive refractive power. The object-side surface 11 of the first lens element 10 facing toward the object side 2 is a convex surface and the image-side surface 12 of the first lens element 10 facing toward the image side 3 is a concave surface. Both the object-side surface 11 and the image-side 12 of the first lens element 10 are aspherical surfaces.

The second lens element 20 has positive refractive power. The object-side surface 21 of the second lens element 20 facing toward the object side 2 is a convex surface and the image-side surface 22 of the second lens element 20 facing toward the image side 3 is a convex surface and has a convex part 27 (convex circular periphery part) in a vicinity of its circular periphery. In addition, both the object-side surface 21 and the image-side surface 22 of the second lens element 20 are aspherical surfaces.

The third lens element 30 has positive refractive power, an object-side surface 31 of the third lens element 30 facing toward the object side 2 and an image-side surface 32 of the third lens element 30 facing toward the image side 3. The object-side surface 31 is a concave surface. The image-side surface 32 has a convex part 36 (convex optical axis part) in the vicinity of the optical axis and a concave part 37 (concave circular periphery part) in a vicinity of its circular periphery. In addition, both the object-side surface 31 and the mage-side surface 32 of the third lens element 30 are aspherical surfaces.

The fourth lens element 40 has negative refractive power. The object-side surface 41 of the fourth lens element 40 facing toward the object side 2 has a convex part 43 (convex optical axis part) in the vicinity of the optical axis and a concave part 44 (concave circular periphery part) in a vicinity of its circular periphery. The image-side surface 42 of the fourth lens element 40 facing toward the image side 3 has a concave part 46 (concave optical axis part) in the vicinity of the optical axis and a convex part 47 (convex circular periphery part) in a vicinity of its circular periphery. In addition, both the object-side surface 41 and the image-side 42 of the fourth lens element 40 are aspherical surfaces.

The fifth lens element 50 has positive refractive power, an object-side surface 51 of the fifth lens element 50 facing toward the object side 2 and an image-side surface 52 of the fifth lens element 50 facing toward the image side 3. The object-side surface 51 has a convex part 53 (convex optical axis part) in the vicinity of the optical axis and a concave part 54 (concave circular periphery part) in a vicinity of its circular periphery. The image-side surface 52 has a concave part 56 (concave optical axis part) in the vicinity of the optical axis and a convex part 57 (convex circular periphery part) in a vicinity of its circular periphery. Further, both the object-side surface 51 and the image-side 52 of the fifth lens element 50 are aspherical surfaces. The filter 60 may be an infrared cut filter, and is disposed between the fifth lens element 50 and the image plane 71.

In the optical imaging lens element 1 of the present invention, the object side 11/21/31/41/51 and image side 12/22/32/42/52 from the first lens element 10 to the fifth lens element 50, total of ten surfaces are all aspherical. These aspheric coefficients are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i}$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant; $a_{2i}$ is the aspheric coefficient of the 2i order.

Figure 3:
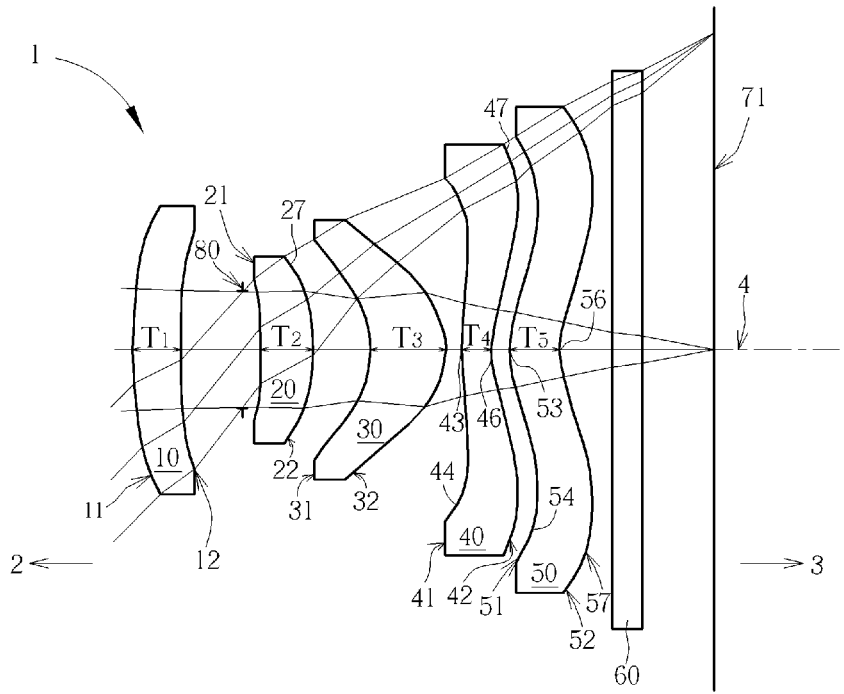
FIG. 3 illustrates a second example of the optical imaging lens set of five lens elements of the present invention.
Figures 4A, 4B, 4C, 4D:
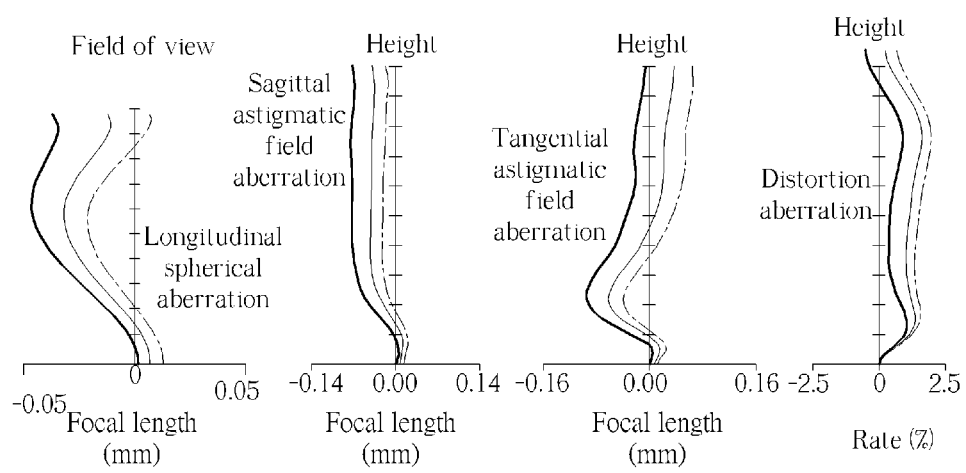
FIG. 4A illustrates the longitudinal spherical aberration on the image plane of the second example.
FIG. 4B illustrates the astigmatic aberration on the sagittal direction of the second example.
FIG. 4C illustrates the astigmatic aberration on the tangential direction of the second example.
FIG. 4D illustrates the distortion aberration of the second example.
Figure 5:
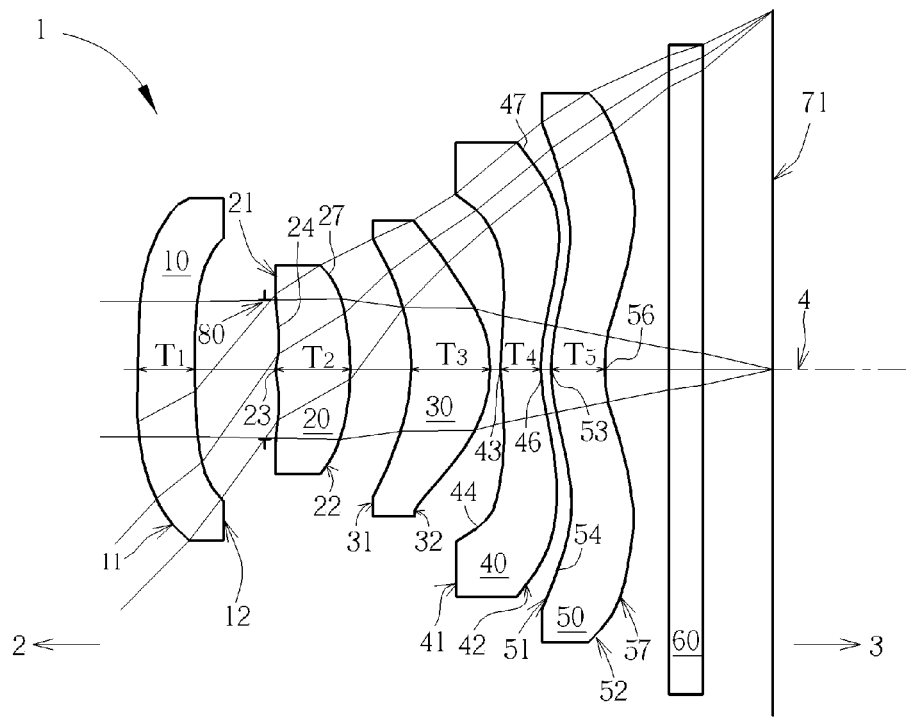
FIG. 5 illustrates a third example of the optical imaging lens set of five lens elements of the present invention.
Figures 6A, 6B, 6C, 6D:
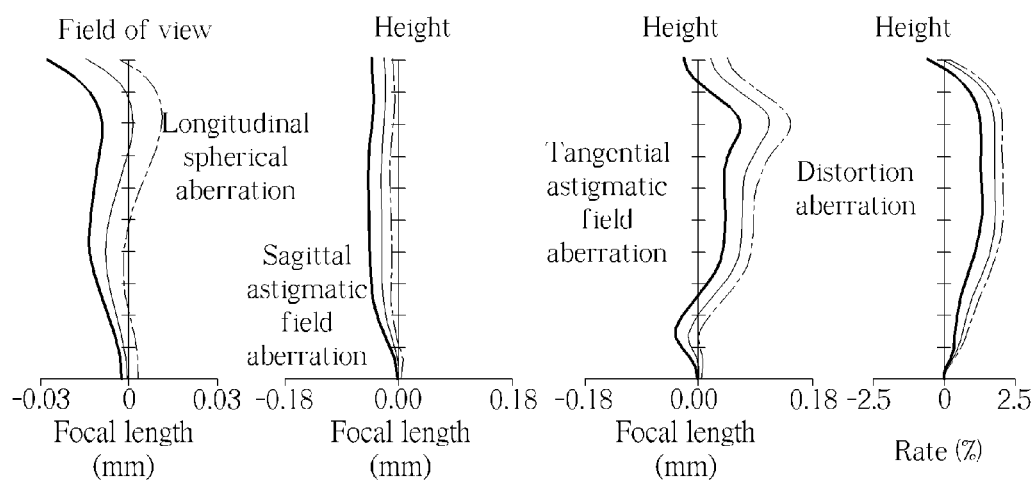
FIG. 6A illustrates the longitudinal spherical aberration on the image plane of the third example.
FIG. 6B illustrates the astigmatic aberration on the sagittal direction of the third example.
FIG. 6C illustrates the astigmatic aberration on the tangential direction of the third example.
FIG. 6D illustrates the distortion aberration of the third example.
Figure 7:
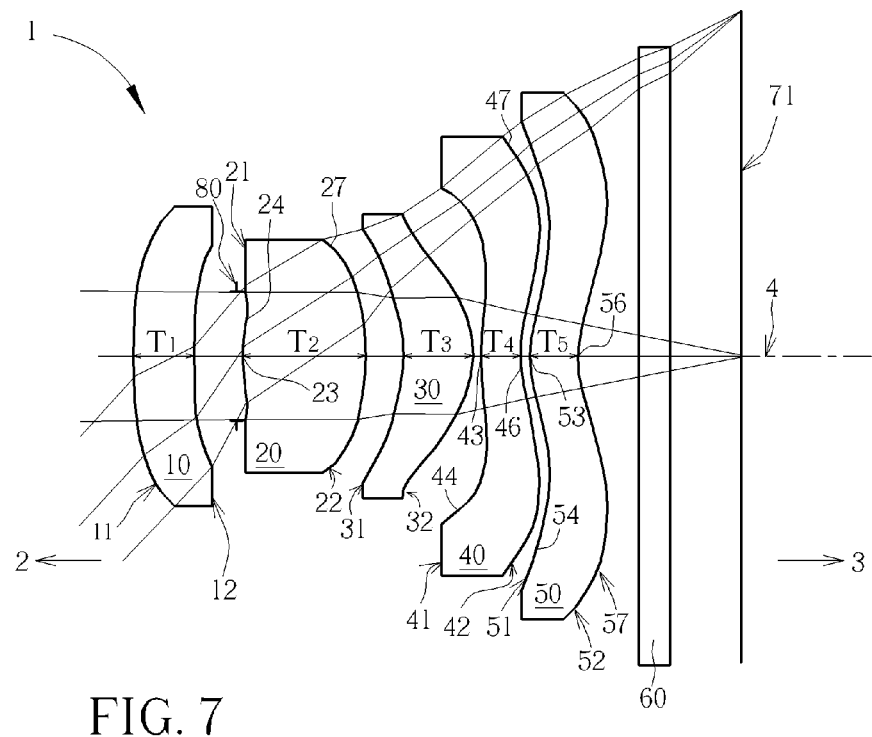
FIG. 7 illustrates a fourth example of the optical imaging lens set of five lens elements of the present invention.
Figures 8A, 8B, 8C, 8D:
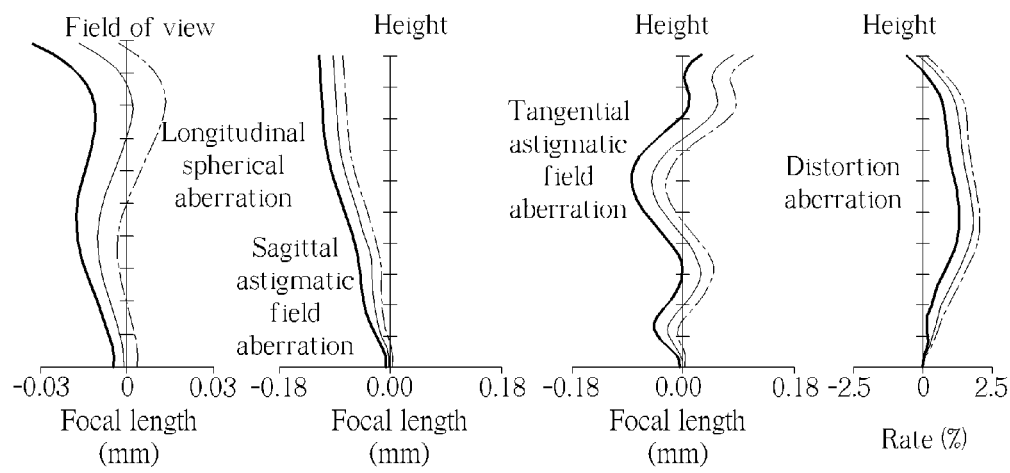
FIG. 8A illustrates the longitudinal spherical aberration on the image plane of the fourth example.
FIG. 8B illustrates the astigmatic aberration on the sagittal direction of the fourth example.
FIG. 8C illustrates the astigmatic aberration on the tangential direction of the fourth example.
FIG. 8D illustrates the distortion aberration of the fourth example.
Figure 9:
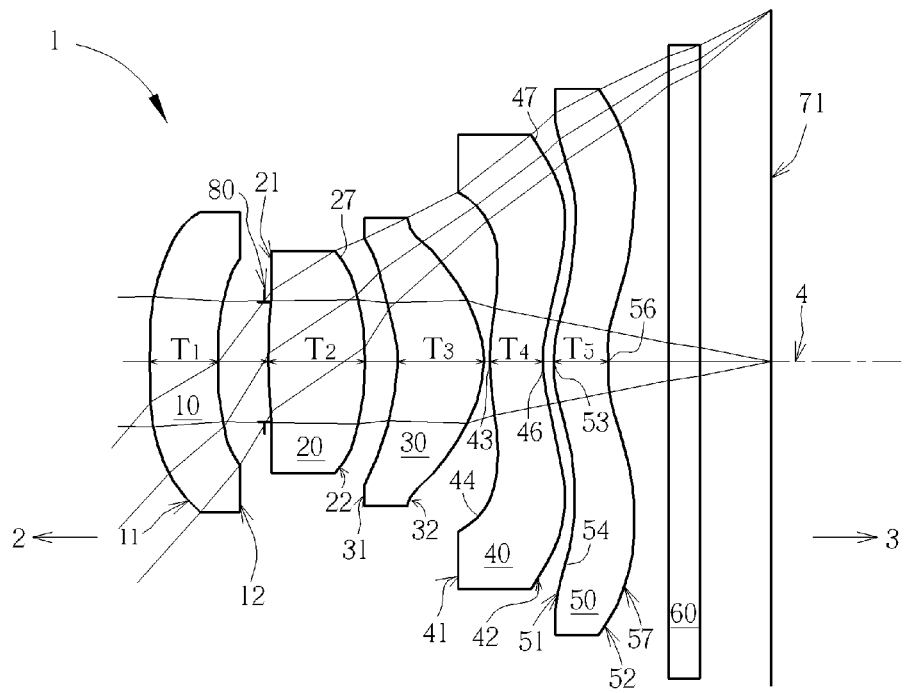
FIG. 9 illustrates a fifth example of the optical imaging lens set of five lens elements of the present invention.
Figures 10A, 10B, 10C, 10D:
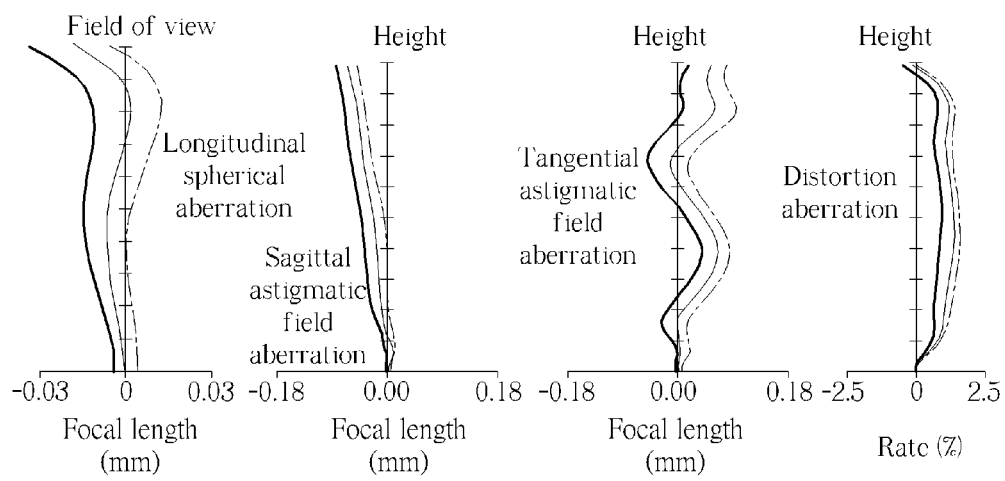
FIG. 10A illustrates the longitudinal spherical aberration on the image plane of the fifth example.
FIG. 10B illustrates the astigmatic aberration on the sagittal direction of the fifth example.
FIG. 10C illustrates the astigmatic aberration on the tangential direction of the fifth example.
FIG. 10D illustrates the distortion aberration of the fifth example.
Figure 11:
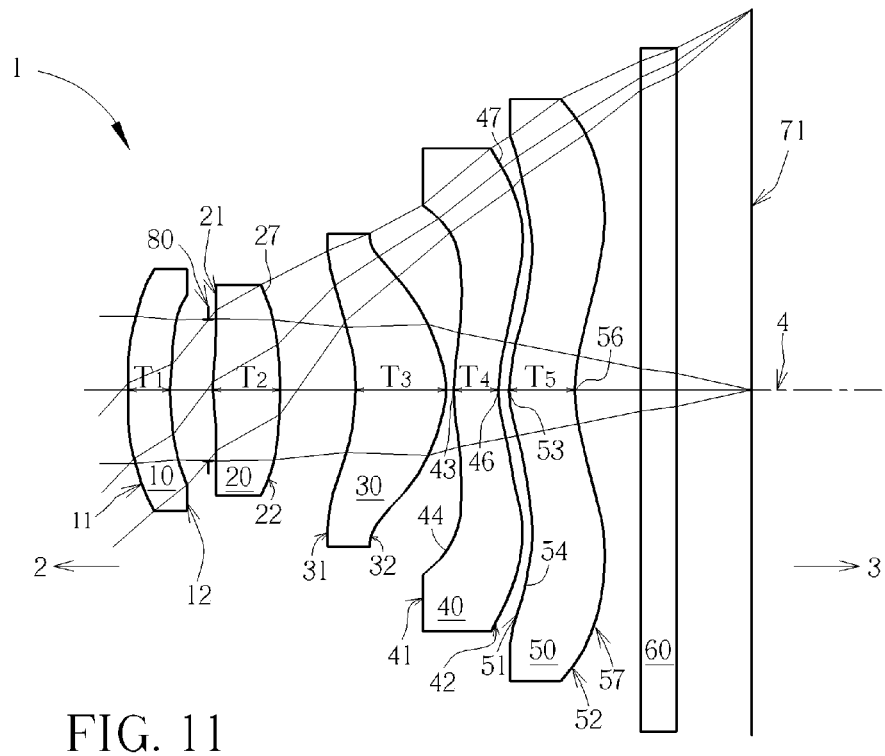
FIG. 11 illustrates a sixth example of the optical imaging lens set of five lens elements of the present invention.
Figures 12A, 12B, 12C, 12D:
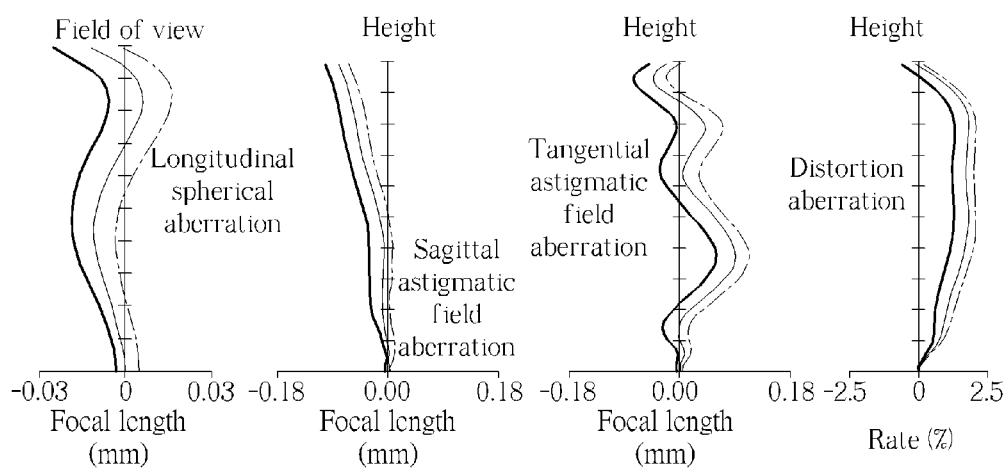
FIG. 12A illustrates the longitudinal spherical aberration on the image plane of the sixth example.
FIG. 12B illustrates the astigmatic aberration on the sagittal direction of the sixth example.
FIG. 12C illustrates the astigmatic aberration on the tangential direction of the sixth example.
FIG. 12D illustrates the distortion aberration of the sixth example.

The optical data of the first example of the optical imaging lens set 1 are shown in FIG. 18 and the Abbe No. is the Abbe number while the aspheric surface data are shown in FIG. 19. In the following examples of the optical imaging lens set, the f-number of the entire optical lens element system is Fno, HFOV stands for the half field of view which is half of the field of view of the entire optical lens element system, and the unit for the curvature radius, the thickness and the focal length is in millimeters (mm), and F is a system focal length Efl of the optical imaging lens set 1. The length of the optical imaging lens set is 3.78 mm (from the first object-side surface to the image plane along the optical axis). The image height is 2.268 mm. Some important ratios of the first example are as follows:

$T_4/G_{12}=1.906$
$E_{fl}/T_2=3.382$
$T_2/T_4=2.361$
$T_1/G_{12}=2.490$
$T_{max}/G_{12}=4.501$
$T_{max}/T_2=1.000$
$G_{aa}/T_1=1.654$
$T_1/T_2=0.553$
$G_{aa}/T_4=2.161$
$V_{D2}-V_{D1}=32.586$ Second Example Please refer to FIG. 3 which illustrates the second example of the optical imaging lens set 1 of the present invention. Please refer to FIG. 4A for the longitudinal spherical aberration on the image plane 71 of the second example; please refer to FIG. 4B for the astigmatic aberration on the sagittal direction; please refer to FIG. 4C for the astigmatic aberration on the tangential direction, and please refer to FIG. 4D for the distortion aberration. The second example is similar with the first example, but the optical data, the object-side surface 21, the image-side surface 32 are different. The object-side surface 21 of the second lens element 20 is a concave surface and the image-side surface 32 of the third lens element 30 is a convex surface. The optical data of the second example of the optical imaging lens set are shown in FIG. 20 while the aspheric surface data are shown in FIG. 21. The length of the optical imaging lens set is 4.17 mm. The image height is 2.268 mm. Some important ratios of the second example are as follows:

$T_4/G_{12}=0.360$
$E_{ff}/T_2=5.998$
$T_2/T_4=1.852$
$T_1/G_{12}=0.587$
$T_{max}/G_{12}=0.933$
$T_{max}/T_2=1.398$
$G_{aa}/T_1=3.682$
$T_1/T_2=0.880$
$G_{aa}/T_4=6.000$
$V_{D2}-V_{D1}=32.586$ Third Example Please refer to FIG. 5 which illustrates the third example of the optical imaging lens set 1 of the present invention. Please refer to FIG. 6A for the longitudinal spherical aberration on the image plane 71 of the second example; please refer to FIG. 6B for the astigmatic aberration on the sagittal direction; please refer to FIG. 6C for the astigmatic aberration on the tangential direction, and please refer to FIG. 6D for the distortion aberration. The third example is similar with the first example, but the optical data, the object-side surface 21, and the image-side surface 32 are different, The object-side surface 21 of the second lens element 20 has a convex part 23 (convex optical axis part) in the vicinity of the optical axis and a concave part 24 (concave circular periphery part) in a vicinity of its circular periphery and the image-side surface 32 of the third lens element 30 is a convex surface. The optical data of the third example of the optical imaging lens set are shown in FIG. 22 while the aspheric surface data are shown in FIG. 23. The length of the optical imaging lens set is 4.04 mm. The image height is 2.268 mm. Some important ratios of the third example are as follows:
$T_4/G_{12}=0.501$
$E_{ff}/T_2=4.417$
$T_2/T_4=1.811$
$T_1/G_{12}=0.699$
$T_{max}/G_{12}=0.973$
$T_{max}/T_2=1.072$
$G_{aa}/T_1=2.844$
$T_1/T_2=0.770$
$G_{aa}/T_4=3.966$
$V_{D2}-V_{D1}=32.586$ Fourth Example Please refer to FIG. 7 which illustrates the fourth example of the optical imaging lens set 1 of the present invention. Please refer to FIG. 8A for the longitudinal spherical aberration on the image plane 71 of the second example; please refer to FIG. 8B for the astigmatic aberration on the sagittal direction; please refer to FIG. 8C for the astigmatic aberration on the tangential direction, and please refer to FIG. 8D for the distortion aberration. The fourth example is similar with the first example, but the optical data, the object-side surface 21, the image-side surface 32 are different. The object-side surface 21 of the second lens element 20 has a convex part 23 (convex optical axis part) in the vicinity of the optical axis and a concave part 24 (concave circular periphery part) in a vicinity of its circular periphery and the image-side surface 32 of the third lens element is a convex surface. The optical data of the fourth example of the optical imaging lens set are shown in FIG. 24 while the aspheric surface data are shown in FIG. 25. The length of the optical imaging lens set is 4.04 mm. The image height is 2.268 mm. Some important ratios of the fourth example are as follows:

$T_4/G_{12}=0.767$
$E_{ff}/T_2=2.574$
$T_2/T_4=3.078$
$T_1/G_{12}=1.177$
$T_{max}/G_{12}=2.360$
$T_{max}/T_2=1.000$
$G_{aa}/T_1=1.783$
$T_1/T_2=0.499$
$G_{aa}/T_4=2.737$
$V_{D2}-V_{D1}=32.586$ Fifth Example Please refer to FIG. 9 which illustrates the fifth example of the optical imaging lens set 1 of the present invention. Please refer to FIG. 10A for the longitudinal spherical aberration on the image plane 71 of the second example; please refer to FIG. 10B for the astigmatic aberration on the sagittal direction; please refer to FIG. 10C for the astigmatic aberration on the tangential direction, and please refer to FIG. 10D for the distortion aberration. The fifth example is similar with the first example, but the optical data and the image-side surface 32 are different. The image-side surface 32 of the third lens element 30 is a convex surface. The optical data of the fifth example of the optical imaging lens set are shown in FIG. 26 while the aspheric surface data are shown in FIG. 27. The length of the optical imaging lens set is 4.04 mm. The image height is 2.268 mm. Some important ratios of the fifth example are as follows:
$T_4/G_{12}=0.981$
$E_{ff}/T_2=3.342$
$T_2/T_4=1.823$
$T_1/G_{12}=1.308$
$T_{max}/G_{12}=1.788$
$T_{max}/T_2=1.000$
$G_{aa}/T_1=1.501$
$T_1/T_2=0.732$
$G_{aa}/T_4=2.003$
$V_{D2}-V_{D1}=32.586$ Sixth Example Please refer to FIG. 11 which illustrates the sixth example of the optical imaging lens set 1 of the present invention. Please refer to FIG. 12A for the longitudinal spherical aberration on the image plane 71 of the second example; please refer to FIG. 12B for the astigmatic aberration on the sagittal direction; please refer to FIG. 12C for the astigmatic aberration on the tangential direction, and please refer to FIG. 12D for the distortion aberration. The sixth example is similar with the first example, but the optical data and the image-side surface 32 are different. The image-side surface 32 of the third lens element 30 is a convex surface. The optical data of the sixth example of the optical imaging lens set are shown in FIG. 28 while the aspheric surface data are shown in FIG. 29. The length of the optical imaging lens set is 3.74 mm. The image height is 2.268 mm. Some important ratios of the sixth example are as follows:
$T_4/G_{12}=0.971$
$E_{ff}/T_2=5.477$
$T_2/T_4=1.489$
$T_1/G_{12}=0.944$
$T_{max}/G_{12}=2.016$
$T_{max}/T_2=1.394$
$G_{aa}/T_1=3.358$
$T_1/T_2=0.653$
$G_{aa}/T_4=3.264$
$V_{D2}-V_{D1}=32.586$

Seventh Example

Please refer to FIG. 13 which illustrates the seventh example of the optical imaging lens set 1 of the present invention. Please refer to FIG. 14A for the longitudinal spherical aberration on the image plane 71 of the second example; please refer to FIG. 14B for the astigmatic aberration on the sagittal direction; please refer to FIG. 14C for the astigmatic aberration on the tangential direction, and please refer to FIG. 14D for the distortion aberration. The seventh example is similar with the first example, but the optical data, refractive power of the first lens element 10, the object-side surface 21 and the image-side surface 32 are different. The first lens element 10 has negative refractive power, the object-side surface 21 of the second lens element 20 has a convex part 23 (convex optical axis part) in the vicinity of the optical axis and a concave part 24 (concave circular periphery part) in a vicinity of its circular periphery and the image-side surface 32 of the third lens element 30 is a convex surface. The optical data of the seventh example of the optical imaging lens set are shown in FIG. 30 while the aspheric surface data are shown in FIG. 31. The length of the optical imaging lens set is 3.89 mm. The image height is 2.268 mm. Some important ratios of the sixth example are as follows:

$T_4/G_{12}=0.673$
$E_{fl}/T_2=5.435$
$T_2/T_4=1.741$
$T_1/G_{12}=0.904$
$T_{max}/G_{12}=1.463$
$T_{max}/T_2=1.250$
$G_{aa}/T_1=3.368$
$T_1/T_2=0.772$
$G_{aa}/T_4=4.527$
$V_{D2}-V_{D1}=32.586$ Some important ratios in each example are shown in FIG. 32.

In the light of the above examples, the inventors observe the following features:

1) The convex circular periphery part of the image-side surface of the second lens element and the concave optical axis part as well as the convex circular periphery part of the fourth image-side surface of the fourth lens element work together to minimize the aberrations.

2) The plastic fifth lens element facilitates the reduction of the production cost and the reduction of the weight of the optical imaging lens set.

In addition, it is found that there are some better ratio ranges for different optical data according to the above various important ratios. Better ratio ranges help the designers to design the better optical performance and an effectively reduced length of a practically possible optical imaging lens set. For example:

1. $T_4/G_{12}$ should be not greater than 2.0. When the optical imaging lens set is smaller, the total length should be shorter as well. However, because the concave optical axis part of the image-side surface of the fourth lens element, it may be thinner to satisfy this relationship. It is suggested that $0.1 \leq T_4/G_{12} \leq 2.0$.

2. $E_{fl}/T_2$ should be not greater than 7.0. When the optical imaging lens set is shorter, the focal length should be shorter as well to satisfy this relationship. Preferably, it is $3.0 \leq E_{fl}/T_2 \leq 7.0$. A smaller $T_2$ helps to optimize a better arrange of other lens thickness and gaps when the optical imaging lens set becomes shorter. Or, it is $2.0 \leq E_{fl}/T_2 \leq 7.0$.

3. $T_2/T_4$ should be not less than 1.4. When the optical imaging lens set is smaller, the total length should be shorter as well. However, because the concave optical axis part of the image-side surface of the fourth lens element, it may be thinner to satisfy this relationship. It is suggested that $1.4 \leq T_2/T_4 \leq 3.5$.

4. $T_1/G_{12}$ should be not greater than 2.5. When the optical imaging lens set is smaller, the total length should be shorter as well. When the optical performance and the productivity are taken into consideration, this relationship suggests better results. Preferably, it is $0.5 \leq T_1/G_{12} \leq 2.5$.

5. $T_{max}/G_{12}$ should be between 0.7 and 2.3. When the optical imaging lens set is smaller, the total length should be shorter and the largest thickness should become smaller as well to satisfy this relationship.

6. $T_{max}/T_2$ should be not greater than 1.4. When the optical imaging lens set is smaller, the total length should be shorter and the largest thickness should become smaller as well to satisfy this relationship. Preferably, It is suggested that $0.8 \leq T_{max}/T_2 \leq 1.4$.

7. $G_{aa}/T_1$ should be between 1.5 and 4.0. When the optical imaging lens set is smaller, the total length should be shorter as well. When the optical performance and the productivity are taken into consideration, this relationship suggests better results.

8. $T_1/T_2$ should be not greater than 1.1. When the optical imaging lens set is smaller, the total length should be shorter as well. When the optical performance and the productivity are taken into consideration, this relationship suggests better results. Preferably, It is suggested that $0.3 \leq T_1/T_2 \leq 1.1$.

9. $G_{aa}/T_4$ should be between 2.0 and 8.0. When the optical imaging lens set is smaller, the total length should be shorter as well. When the optical performance and the productivity are taken into consideration, this relationship suggests better results.

10. $V_{D2}-V_{D1}$ should be not less than 30. Abbe Number is used to evaluate the dispersion properties of a lens. A shortened lens set would have worse dispersion properties. This relationship facilitates to reduce the dispersion properties. Preferably, It is suggested that $30 \leq V_{D2}-V_{D1} \leq 36$.

Figure 16:
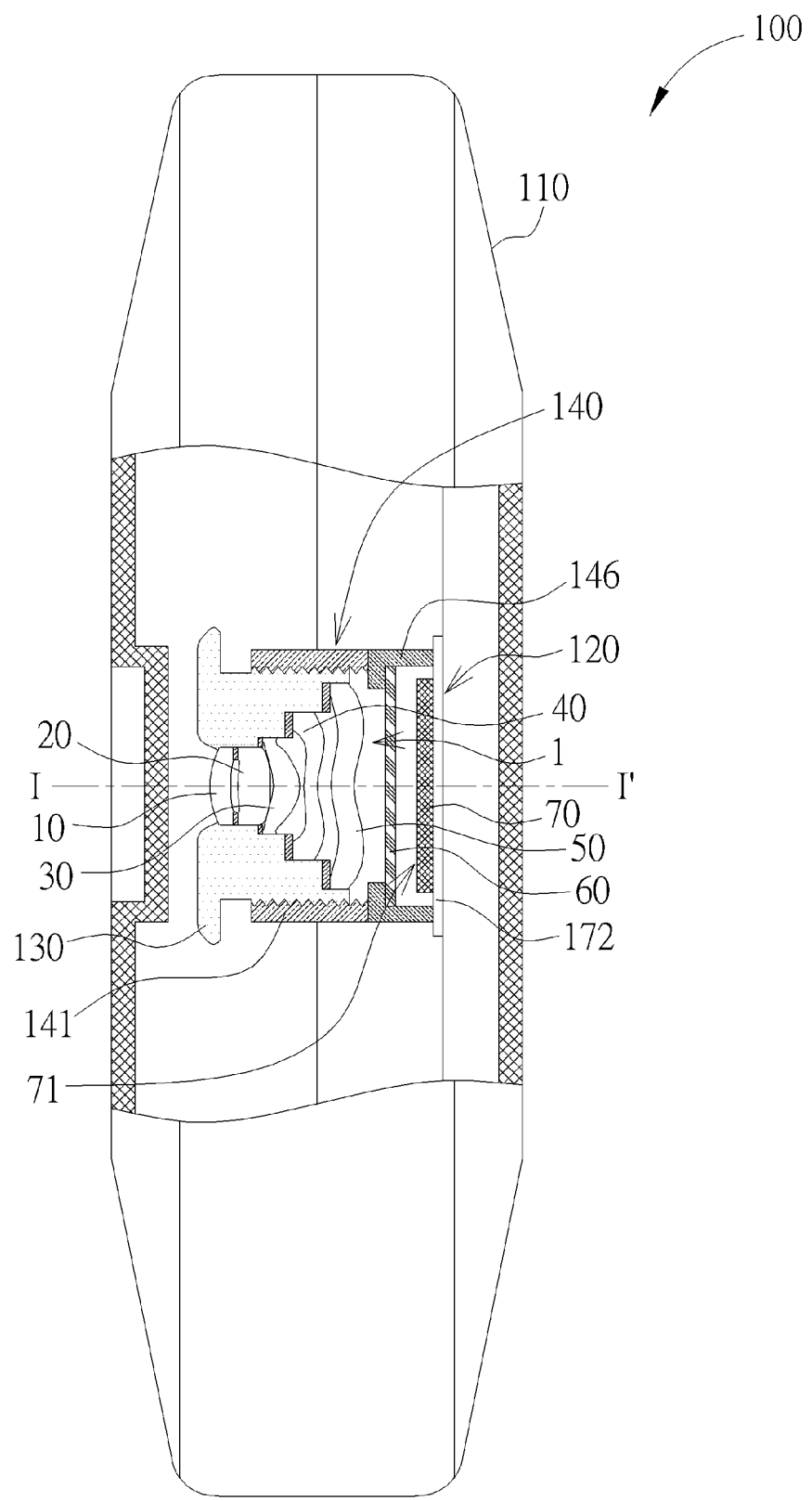
FIG. 16 illustrates a first preferred example of the portable electronic device with an optical imaging lens set of the present invention.

The optical imaging lens set 1 of the present invention may be applied to a portable electronic device. Please refer to FIG. 16. FIG. 16 illustrates a first preferred example of the optical imaging lens set 1 of the present invention for use in a portable electronic device 100. The portable electronic device 100 includes a case 110, and an image module 120 mounted in the case 110. A mobile phone is illustrated in FIG. 16 as an example, but the portable electronic device 100 is not limited to a mobile phone.

As shown in FIG. 16, the image module 120 includes the optical imaging lens set 1 as described above. FIG. 16 illustrates the aforementioned first example of the optical imaging lens set 1. In addition, the portable electronic device 100 also contains a barrel 130 for the installation of the optical imaging lens set 1, a module housing unit 140 for the installation of the barrel 130, a substrate 172 for the installation of the module housing unit 140 and an image sensor 70 disposed at the substrate 172, and at the image side 3 of the optical imaging lens set 1. The image sensor 70 in the optical imaging lens set 1 may be an electronic photosensitive element, such as a charge coupled device or a complementary metal oxide semiconductor element. The image plane 71 forms at the image sensor 70.

The image sensor 70 used here is a product of chip on board (COB) package rather than a product of the conventional chip scale package (CSP) so it is directly attached to the substrate 172, and protective glass is not needed in front of the image sensor 70 in the optical imaging lens set 1, but the present invention is not limited to this.

To be noticed in particular, the optional filter 60 may be omitted in other examples although the optional filter 60 is present in this example. The case 110, the barrel 130, and/or the module housing unit 140 may be a single element or consist of a plurality of elements, but the present invention is not limited to this.

Each one of the five lens elements 10, 20, 30, 40 and 50 with refractive power is installed in the barrel 130 with air gaps disposed between two adjacent lens elements in an exemplary way. The module housing unit 140 has a lens element housing 141, and an image sensor housing 146 installed between the lens element housing 141 and the image sensor 70. However in other examples, the image sensor housing 146 is optional. The barrel 130 is installed coaxially along with the lens element housing 141 along the axis I-I', and the barrel 130 is provided inside of the lens element housing 141.

Because the optical imaging lens set 1 of the present invention may be as short as 3.78 mm, this ideal length allows the dimensions and the size of the portable electronic device 100 to be smaller and lighter, but excellent optical performance and image quality are still possible. In such a way, the various examples of the present invention satisfy the need for economic benefits of using less raw materials in addition to satisfy the trend for a smaller and lighter product design and consumers' demands.

Figure 17:
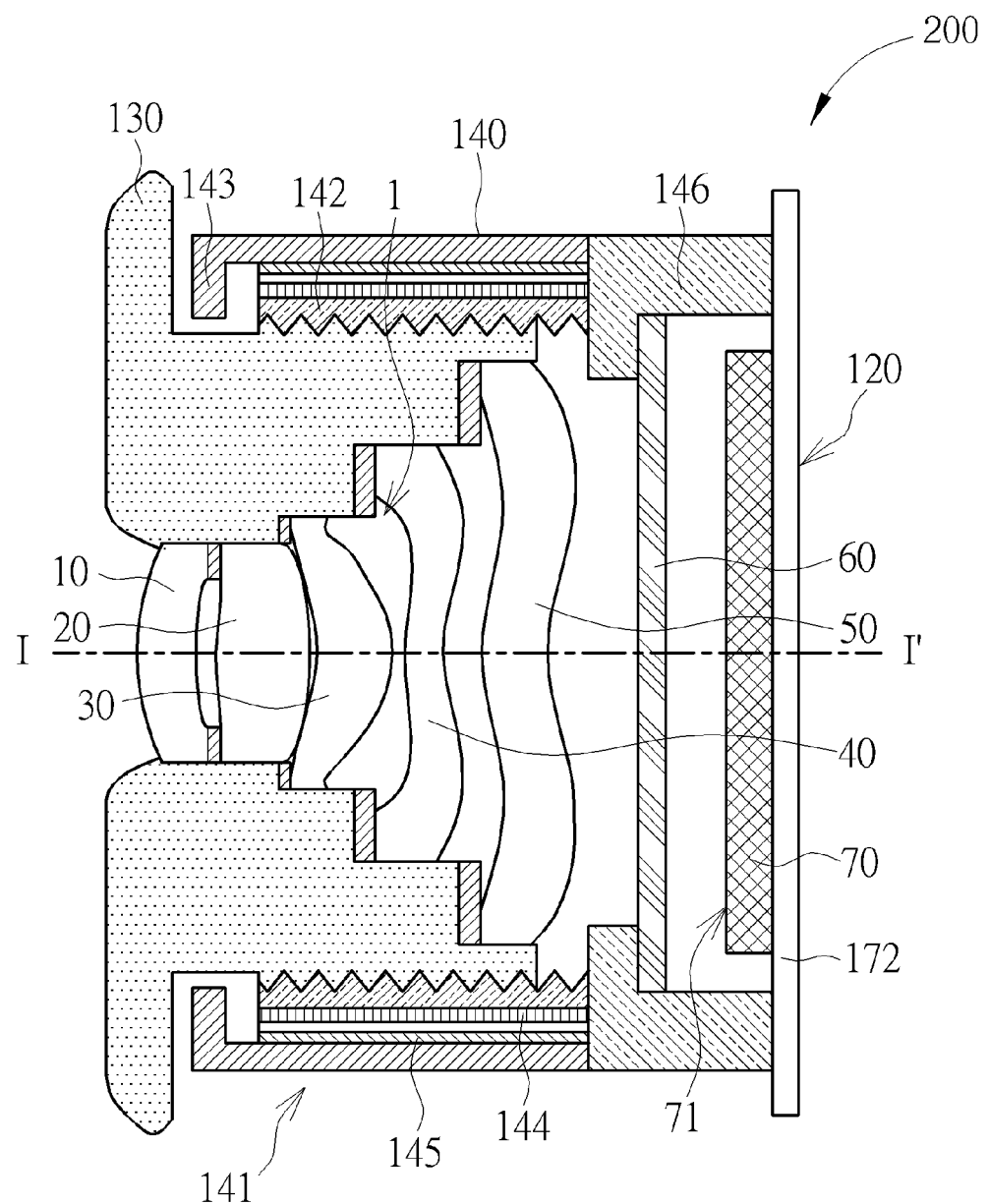
FIG. 17 illustrates a second preferred example of the portable electronic device with an optical imaging lens set of the present invention.

Please also refer to FIG. 17 for another application of the aforementioned optical imaging lens set 1 in a portable electronic device 200 in the second preferred example. The main differences between the portable electronic device 200 in the second preferred example and the portable electronic device 100 in the first preferred example are: the lens element housing 141 has a first seat element 142, a second seat element 143, a coil 144 and a magnetic component 145. The first seat element 142 is for the installation of the barrel 130, exteriorly attached to the barrel 130 and disposed along the axis I-I'. The second seat element 143 is disposed along the axis I-I' and surrounds the exterior of the first seat element 142. The coil 144 is provided between the outside of the first seat element 142 and the inside of the second seat element 143. The magnetic component 145 is disposed between the outside of the coil 144 and the inside of the second seat element 143.

The first seat element 142 may pull the barrel 130 and the optical imaging lens set 1 which is disposed inside of the barrel 130 to move along the axis I-I', namely the optical axis 4 in FIG. 1. The image sensor housing 146 is attached to the second seat element 143. The filter 60, such as an infrared filter, is installed at the image sensor housing 146. Other details of the portable electronic device 200 in the second preferred example are similar to those of the portable electronic device 100 in the first preferred example so they are not elaborated again.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens set, comprising: a first lens element, a second lens element, a third lens element, a fourth lens element and a plastic fifth lens element from an object side toward an image side in order along an optical axis and each lens element having refractive power, wherein:
   said first lens element having an object-side surface facing toward said object side and said object-side surface is a convex surface;
   said second lens element having an image-side surface facing toward said image side and said image-side surface having a convex portion in a vicinity of a circular periphery of said second lens element;
   said fourth lens element having an image-side surface facing toward said image side and said image-side surface having a concave portion in a vicinity of said optical axis and a convex portion in a vicinity of a circular periphery of said fourth lens element;
   said first lens element, said second lens element, said third lens element, said fourth lens element and said fifth lens element each has an image-side surface facing toward said image side and an object-side surface facing toward said object side; and
   said optical imaging lens set exclusively has five lens elements with refractive power, wherein a thickness $T_1$ of said first lens element along said optical axis and an air gap $G_{12}$ between said first lens element and said second lens element along said optical axis satisfy a relationship $0.5 \leq T_1/G_{12} \leq 2.5$, and a thickness $T_4$ of said fourth lens element along said optical axis and the air gap $G_{12}$ between said first lens element and said second lens element along said optical axis satisfy a relationship $T_4/G_{12} \leq 2.0$.

2. The optical imaging lens set of claim 1, wherein a focal length $E_{fl}$ of said optical imaging lens set and an a thickness $T_2$ of said second lens element along said optical axis satisfy a relationship $3.0 \leq (E_{fl}/T_2) \leq 7.0$.

3. The optical imaging lens set of claim 1, wherein a thickness $T_2$ of said second lens element along said optical axis and a thickness $T_4$ of said fourth lens element along said optical axis satisfy a relationship $1.4 \leq (T_2/T_4) \leq 3.5$.

4. The optical imaging lens set of claim 1, wherein a focal length $E_{fl}$ of said optical imaging lens set and an a thickness $T_2$ of said second lens element along said optical axis satisfy a relationship $(E_{fl}/T_2) \leq 7.0$.

5. The optical imaging lens set of claim 4, wherein a maximal thickness $T_{max}$ among said five lens elements along said optical axis and an air gap $G_{12}$ between said first lens element and said second lens element along said optical axis satisfy a relationship $0.7 \leq (T_{max}/G_{12}) \leq 2.3$.

6. The optical imaging lens set of claim 1, wherein a maximal thickness $T_{max}$ among said five lens elements along said optical axis and a thickness $T_2$ of said second lens element along said optical axis satisfy a relationship $T_{max}/T_2 \leq 1.4$.

7. The optical imaging lens set of claim 1, wherein a thickness $T_1$ of said first lens element along said optical axis and the sum of all four air gaps $G_{aa}$ between each lens element from said first lens element to said fifth lens element along the optical axis satisfy a relationship $1.5 \leq G_{aa}/T_1 \leq 4.0$.

8. The optical imaging lens set of claim 7, wherein a thickness $T_2$ of said second lens element along said optical axis satisfies a relationship $T_1/T_2 \leq 1.1$.

9. The optical imaging lens set of claim 1, wherein a thickness $T_4$ of said fourth lens element along said optical axis and the sum of all four air gaps $G_{aa}$ between each lens element from said first lens element to said fifth lens element along the optical axis satisfy a relationship $2.0 \leq G_{aa}/T_4 \leq 8.0$.

10. The optical imaging lens set of claim 9, wherein a thickness $T_2$ of said second lens element along said optical axis satisfies a relationship $1.4 \leq T_2/T_4$.

11. The optical imaging lens set of claim 1, wherein an abbe number $VD_1$ of said first lens element and an abbe number $VD_2$ of said second lens element satisfy a relationship $30 \leq VD_2 - VD_1$.

12. An electronic device, comprising:
   a case; and
   an image module disposed in said case and comprising:
      an optical imaging lens set of claim 1;

a barrel for the installation of said optical imaging lens set;
a module housing unit for the installation of said barrel; and
an image sensor disposed at an image side of said optical imaging lens set.

* * * * *